US008328617B2

(12) United States Patent
Nakamura et al.

(10) Patent No.: US 8,328,617 B2
(45) Date of Patent: Dec. 11, 2012

(54) SECONDARY ROULETTE GAME

(75) Inventors: Daisuke Nakamura, Zama (JP); Kenji Nagata, Botany (AU)

(73) Assignee: Konami Gaming, Inc., Las Vegas, NV (US)

( * ) Notice: Subject to any disclaimer, the term of this patent is extended or adjusted under 35 U.S.C. 154(b) by 1034 days.

(21) Appl. No.: 12/006,640

(22) Filed: Jan. 4, 2008

(65) Prior Publication Data

US 2009/0176548 A1 Jul. 9, 2009

(51) Int. Cl.
*A63F 13/00* (2006.01)

(52) U.S. Cl. .......... 463/17; 463/25

(58) Field of Classification Search .......... 463/12, 463/17, 25; 273/274, 142 E, 142 HA
See application file for complete search history.

(56) References Cited

U.S. PATENT DOCUMENTS 6,217,022 B1 * 4/2001 Astaneha .......... 273/138.1
6,533,273 B2 * 3/2003 Cole et al. .......... 273/138.1
6,776,714 B2 * 8/2004 Ungaro et al. .......... 463/27
6,921,072 B2 * 7/2005 Hughes-Watts .......... 273/142 E
7,144,321 B2 * 12/2006 Mayeroff .......... 463/16
7,690,979 B2 * 4/2010 Ogiwara .......... 463/17
7,708,630 B2 * 5/2010 Nicely .......... 463/17
7,850,171 B2 * 12/2010 Bontempo et al. .......... 273/142 H
7,901,280 B2 * 3/2011 Jarvis et al. .......... 463/17
2001/0003709 A1 * 6/2001 Adams .......... 463/20
2003/0094752 A1 * 5/2003 Mathews .......... 273/138.1
2004/0087357 A1 * 5/2004 Johnson .......... 463/17
2005/0212210 A1 * 9/2005 Ogiwara .......... 273/274
2005/0277457 A1 * 12/2005 Wilson .......... 463/12
2006/0157928 A1 * 7/2006 O'Halloran .......... 273/142 R
2007/0054723 A1 * 3/2007 Mattice et al. .......... 463/16
2008/0211180 A1 * 9/2008 Lutnick et al. .......... 273/142 C
2009/0117993 A1 * 5/2009 Bigelow et al. .......... 463/22
2010/0148442 A1 * 6/2010 Walker et al. .......... 273/274

* cited by examiner

*Primary Examiner* — Peter DungBa Vo
*Assistant Examiner* — Nicholas Ditoro
(74) *Attorney, Agent, or Firm* — Masuvalley & Partners

(57) ABSTRACT

A plurality of gaming machines for paying out award corresponding to a play, comprising an executor for starting a primary game and a secondary roulette game, a controller for manipulating a secondary roulette to determine a winning gaming machine in the secondary game, a display for representing a winning odds of the secondary roulette game on the roulette, and a decision unit for determining the winning odds corresponding to wager.

16 Claims, 12 Drawing Sheets

SECONDARY ROULETTE GAME

TECHNICAL FIELD

The present invention relates to a game particularly relates to a multiplayer type game, which displays winning ratio of each player on a roulette in a secondary game, on which the player can compete with each other.

BACKGROUND OF THE INVENTION

As a conventional multiplayer type game, jackpot style gaming systems are known. There are various types of jackpot style gaming systems. For example, a plurality of players sits around a roulette form table, which displays winning odds, and the roulette spins as a bonus game begins. And, the game, which allows the player to obtain award amount according to the odds indicated in front of each player, exists.

Also, the U.S. Patent Application Publication No. 2006-0157928 discloses a gaming machine, which allows a plurality of players surrounding a roulette to enjoy a game. This game is capable of changing an award amount according to the player's wager.

However, no multiplayer type game, which displays the winning ratio of each player on the roulette in the secondary game and allows the players to compete with each other, has existed.

SUMMARY OF THE INVENTION

One aspect of the present invention is a plurality of gaming machines for paying out award corresponding to a play. The gaming machines includes an executor for starting a primary game and a secondary roulette game, a controller for manipulating a secondary roulette to determine a winning gaming machine in the secondary game, a display for representing a winning odds of the secondary roulette game on the roulette, and a decision unit for determining the winning odds corresponding to wager.

By configuring as described above, the winning odds of a plurality of players are displayed on the roulette in the secondary game. This game is a multiplayer type game and any one of the players will be a winner, thereby the competition among the players can be encouraged. And, the winning odds are displayed on the roulette, which has been evolved ordinarily, thereby the players can visually recognize their own winning odds easily and they can concentrate on winning or losing. Further, the winning odds displayed on the roulette change corresponding to the player's wager, thereby the element of gambling is enhanced in the game.

The display may represent the winning odds of at least two gaming machines on the roulette.

By configuring as described above, the winning odds of a plurality of the players are displayed on the roulette, thereby the competition among the players can be encouraged. Further, a new game concept of a game allowing players to compete with each other can be provided.

The secondary roulette game may have frames on a wheel, the display may represent a symbol indicating the gaming machine on the frames, and the controller chooses the symbol to determine the winning gaming machine in the secondary roulette game.

By configuring as described above, the symbol representing each player is displayed on the roulette, thereby the player can easily identify his or her winning odds visually.

The number of symbols represented on the frames depends on the wager.

By configuring as described above, the game in which the symbol representing the player on the roulette increases as the wager increases can be provided. Unlike a case when only the number changes, when the number of symbol representing the player increases and the occupancy rate on the roulette increases, the player can significantly feel the sense of superiority and expectation.

The symbols represented on at least adjoining two frames of the wheel may be the same.

When the symbols representing the player on the roulette are congregated, it is very easy for the player to see, thereby enables the player to concentrate on the result of the game.

The symbols represented on adjoining frames of the frames may be different.

When the symbols representing the player are spread on the roulette, it is difficult for the player to determine win or lose, thereby the player can be teased and entertained.

The symbol is a code, a sign, a picture, a color or a number.

By configuring as described above, the roulette can be more decorative and colorful, which enables to contribute the game presentation.

The primary game is also roulette game, and the number of frames of the primary roulette game is different from the number of frames of the secondary roulette game.

Another aspect of the present invention is at least two gaming machines for providing a game started by inputting wager and for paying out to a player. The gaming machines includes a first starter for beginning a primary card game, a second starter for randomly beginning a secondary game with a secondary roulette, and a display for showing a winning ratio of the gaming machine, which is changed corresponding to a wager amount, on the secondary roulette.

By configuring as described above, the winning ratio of a plurality of the players are displayed on the roulette in the secondary game. This game is a multiplayer type game and any one of the players will be a winner, thereby the competition among the players can be encouraged. And, the winning ratio are displayed on the roulette, which has been evolved ordinarily, thereby players can visually recognize their own winning ratio easily and they can concentrate on winning or losing. Further, the winning ratio displayed on the roulette change according to the player's wager, thereby the element of gambling is enhanced in the game. Further, a new game concept of a game allowing players to compete with each other can be provided.

At least two gaming machines include a selection unit for choosing a winning gaming machine by the secondary roulette.

The secondary roulette has rims on a wheel, the display shows a mark, which corresponds to the gaming machine, on a space between the rims, and the selection unit chooses the mark to determine the winning gaming machine in the secondary game.

By configuring as described above, the symbol representing each player is displayed on the roulette, thereby the player can easily identify his or her winning ratio visually.

The selection unit chooses at least two marks in one secondary game.

By configuring as described above, a plurality of players win in one game. Unlike in a case where there is only one winner in one game, the expectation of the player can further be raised because the winning ratios of the player increase. Further, the complexity of the game and the element of gambling can be enhanced.

The selection unit has at least two means for choosing the mark.

By configuring as described above, various game plots can be provided. For example, an arrow and a ball decide a plurality of winners, thereby the game can be more enjoyable. Further, the complexity of the game and the element of gambling can be enhanced.

The selection unit has an indicator with at least two different colors to choose the mark. By configuring as described above and using varieties of colors, the presentation effect of the game can be enhanced.

The indicator is a ball, an arrow or a star. By configuring as described above and utilizing a plurality of types of selection unit, the presentation effect and the functionality of the game can be enhanced.

The selection unit chooses at least two marks at the same time. By configuring as described above, since the plurality of items are decided at the same time, the expectation of the player can further be raised. Further, the element of gambling can be enhanced.

The display shows the winning ratio of one of the two gaming machines, which is changed corresponding to a wager amount, on the secondary roulette. By configuring as described above, the winning ratio of only one player among a plurality of the players can be displayed on the roulette, thereby the element of the game can be enhanced.

DETAILED DESCRIPTION OF INVENTION

Figure 1:
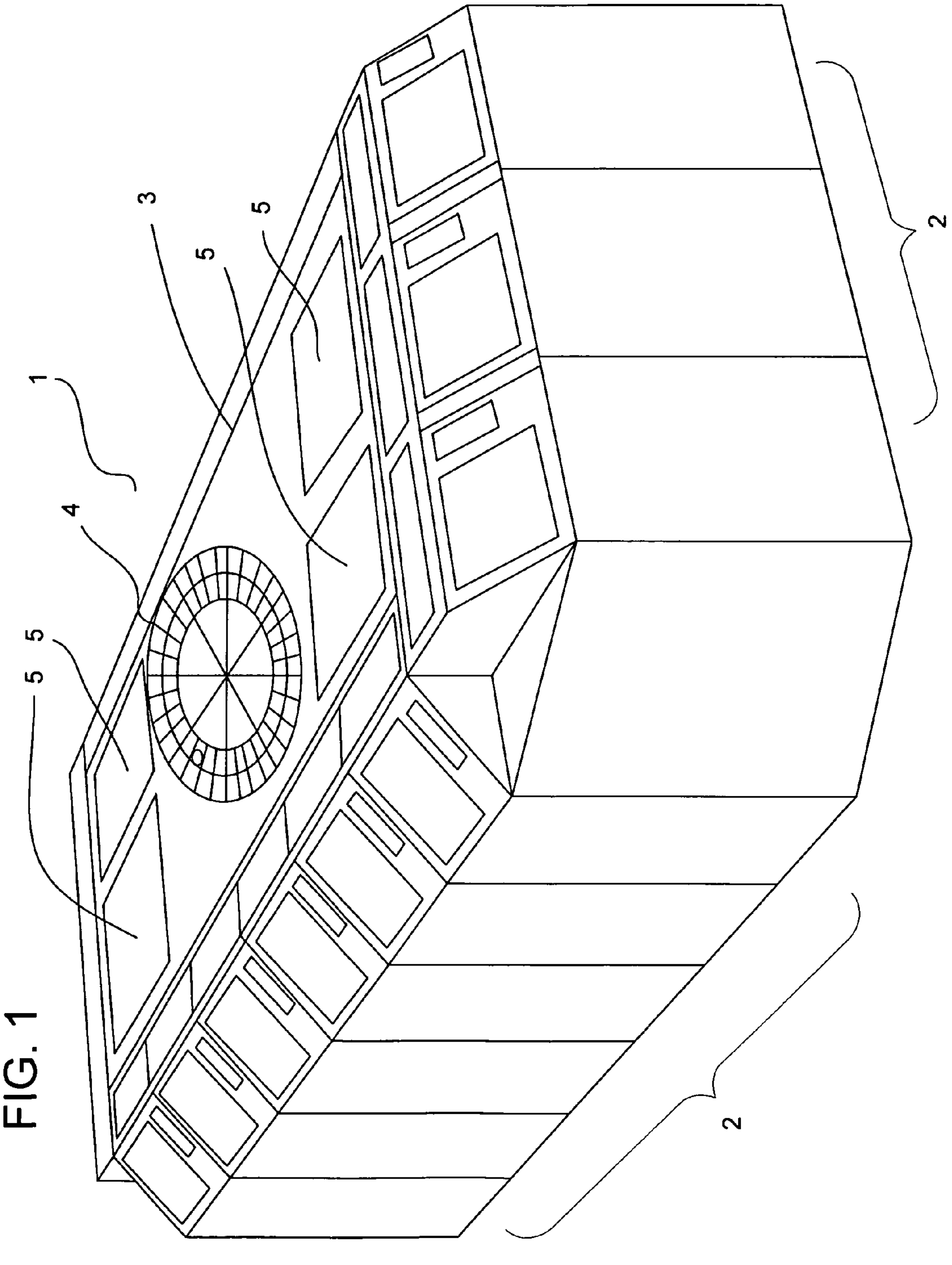
FIG. 1 illustrates a gaming system of the present invention.

FIG. 1 illustrates a gaming system of the present invention. A gaming system 1 is provided with a plurality of gaming machines 2 and a display 3. On the display 3, a roulette 4 is displayed. On the plurality of gaming machines 2, a plurality of players can play a game, and a primary game or a secondary game is executed. The plurality of gaming machines 2 are communicated with each other, and configured to share some sort of games.

The timing when transitioning from the primary game to the secondary game may be at any time. For example, the secondary game may suddenly be started with no relation to a result of the primary game. In such case, the timing when the secondary game is started may randomly or orderly be decided by a machine. Also, the secondary game may be started according to the result of the primary game.

The type of the primary game is not specifically limited. It may be, for example, a card game, a roulette game, or a reel game. The type of the card game may be, for example, black jack, poker game, or mah-jong game.

Meanwhile, the type of the secondary game is not specifically limited. It may be, for example, a progressive game, a bonus game, a jackpot game, or a free game. The roulette 4 is used in the secondary game. The gaming system 1 may be configured to begin the secondary game after the primary game is executed.

The number of the plurality of gaming machines 2 may be in any number. It may be, for example, three or six. The display 3 may display anything. For example, a progressive award amount 5 used in the progressive game may be displayed. For example, a display to boost the game presentation, such as a plurality of small roulettes around the roulette 4 or a plurality of fireworks, may be provided on the display 3. The gaming system 1 may have displays other than the display 3, and it may have, for example, two large-screen displays.

Further, the gaming system 1 may not have any display, and the items to be displayed on the display 3 may be displayed on the displays of the plurality of gaming machines 2. And, the roulette 4 used in the secondary game may not need to be displayed on the display, and it may be, for example, a roulette made of wood or plastic.

Figure 2:
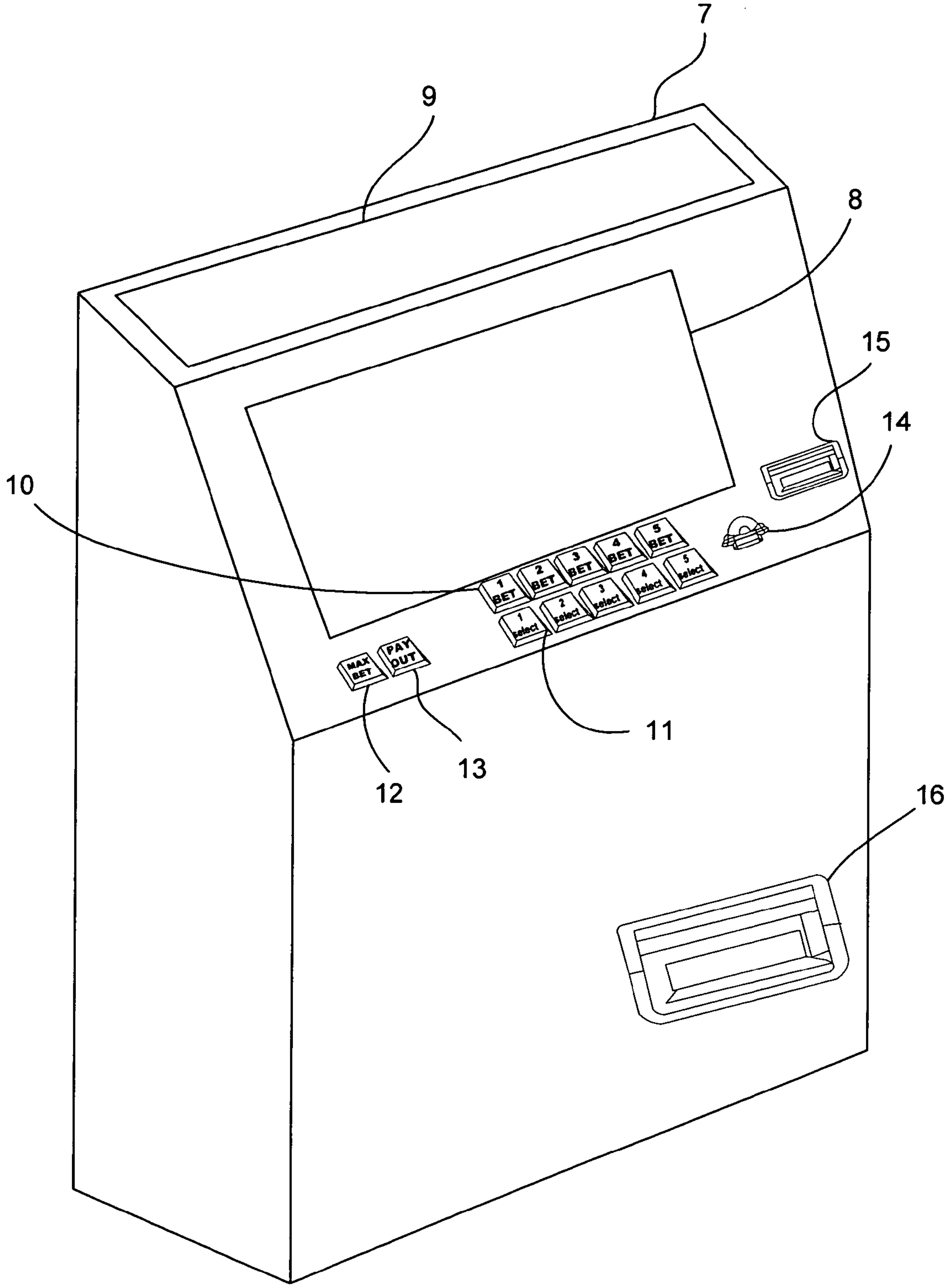
FIG. 2 is a diagonal view showing an example of a gaming machine of the present invention.

FIG. 2 is a diagonal view showing an example of a gaming machine of the present invention. As shown in FIG. 2, a gaming machine 7 is provided with displays 8 and 9. Right below the display 8, provided are a BET switch 10, a SELECT switch 11, a MAX BET switch 12, a PAYOUT switch 13, coin slot 14 and a bill slot 15. The BET switch 10 has five switches from 1 BET to 5 BET. The SELECT switch 11 has five switches from 1 SELECT to 5 SELECT. A coin payout slot 16 is provided on the lower right side of the gaming machine 7.

On the displays 8 or 9, for example, a display to play the primary game or the secondary game is shown. On the displays 8 or 9, for example, cards to be used in a card game, a roulette or coins to be used in a roulette game, or reels or features to be used in a reel game are displayed. Also, a display for a player to choose a type of the progressive game or the bonus game, or a display for a player to choose a feature is displayed. The displays 8 or 9 may also display a progressive screen to show an amount that can be awarded to a player. Further, the displays 8 or 9 may display a presentation corresponding to the progress of a game, the credit inputted to the gaming machine by a player, or a play history of the player.

The BET switch 10 is for inputting a bet amount to a game. A player is able to input the bet amount of 1 bet through 5 bets in one game by using the BET switch 10. The SELECT switch 11 is, for example, for a player to choose a card, which he or she wants to discard, or to choose a line on a reel. The number of the BET switch 10 and the SELECT switch 11 is not limited to five each. For example, there may be a switch to input 10 BET or 10 SELECT.

The MAXBET switch 12 is a switch for a player to input the maximum bet amount on one game. The PAYOUT switch 13 is for paying out the amount credited in the gaming machine to the player. The coin slot 14 is a hole for a player to credit coins into the gaming machine. The bill slot 15 is a hole for a player to input a bill or a prepaid card to the gaming machine, or is used for paying out the credited amount in the gaming machine 7 to the player. The coin payout slot 16 is for paying out the credited amount in the gaming machine to a player.

The gaming machine of the present invention is not limited to those described above. The gaming machine may be provided with other functions, or some of the functions described above may be omitted. For example, when a player proceeds into a secondary game, an illumination device for illuminating a gaming machine with not less than 1 color may be provided on the gaming machine. Also, when a player proceeds into the secondary game, a device for vibrating the entire gaming machine or outputting sound may be provided on the gaming machine. Also, not less than 3 display screens may be provided on the gaming machine 7. Also, a switch for a player to re-select the same bet and line from a previous game may be provided on the gaming machine 7.

Further, the reel or the roulette used in the game may not need to be displayed on the display, a stepper (a mechanical reel) or a mechanical roulette may be mounted on the gaming machine 7. The items described above that may be displayed on the display 3 may also be displayed on the displays 8 or 9. And the items described above that may be displayed on the displays 8 or 9 may also be displayed on the display 3.

Figure 3:
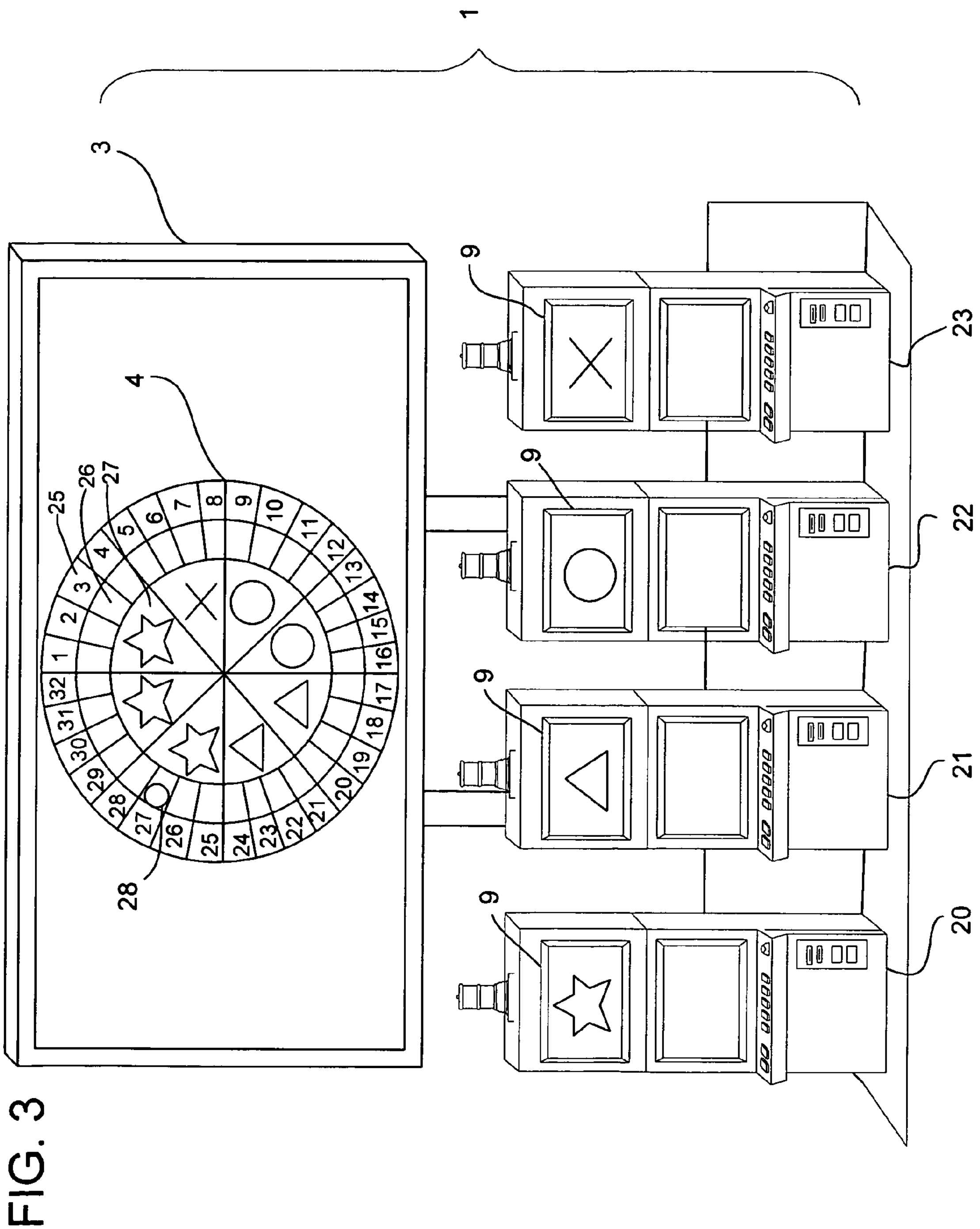
FIG. 3 illustrates an example of a secondary game pertaining to the present invention.

FIG. 3 illustrates an example of a secondary game pertaining to the present invention. The gaming system 1 is provided with the plurality of gaming machines 2 and a display 3. The roulette 4 is shown on the display 3. The roulette 4 is provided with an outer frame 25, a middle frame 26, an inner frame 27 and a selection unit 28. The selection unit 28 (here, it is a ball) selects any of symbols (star, triangle, circle, X) shown in the inner frame 27. The symbols (star, triangle, circle, X) shown in the inner frame 27 corresponds to each of machines 20, 21, 22 and 23. On the display 9 of each machine, a symbol (star, triangle, circle or X) is displayed.

When a roulette game is started, the roulette 4 spins and the ball stops at any position of the inner frame 26. The symbol shown in an inner frame that is adjacent to the middle frame where the ball is stopped is a winning symbol. Then, the award is paid out at the gaming machine displaying the winning symbol. For example, since the selection unit 28 (the ball) has stopped at the position selecting the symbol star in FIG. 3, the star is the winning symbol and the award is paid out at the gaming machine 20. Three stars exist, thus the winning ratio of the star is 3/8.

The style of the secondary game pertaining to the present invention is not limited to those described above. For example, the roulette 4 may have frames other than the outer frame 25, the middle frame 26, and the inner frame 27. The roulette 4 may have, for example, four frames and any one of the outer frame, the middle frame or the inner frame may exist two. Also, each of the outer frame, the middle frame, or the inner frame of the roulette 4 may show anything. For example, the outer frame 25 of the roulette 4 is showing the number 1 through 32, however, these may be figures or pictures. Also, the outer frame, the middle frame or the inner frame of the roulette 4 may not display anything. Also, the roulette may be in a form such that the center portion of the roulette is cut out and there is no inner frame of the roulette.

The symbols (star, triangle, circle, X) are displayed in the inner frame 27 of the roulette 4, however, these symbols may be displayed on the outer frame or the middle frame. Also, the symbol specifying the winning gaming machine is not limited to star, triangle, circle or X, and it may be anything. For example, the symbol may be a code, a sign, a picture, a color or a number. The picture may be anything, for example, it may be a character from a story, any type of animals, or a flag. The color may be any color, and it may be, for example, a mixture of a plurality of colors. The number may be any number, and it may be, for example, a number of two or more digits or a decorated number.

The selection unit 28 may be in any form, and it may be, for example, a ball, an arrow or a star. The selection unit 28 may not need to move, for example, the roulette 4 may spin against the fixed selection unit 28 and choose any symbol on the roulette. The selection unit 28 may not need to be one, and it may be in plural. And a plurality of the selection units 28 may choose a plurality of symbols. For example, two symbols may be chosen by throwing two balls on the roulette in order. Further, two symbols may be chosen by fixing two arrows and rotating the roulette. The timing for choosing the symbols with a plurality of the selection unit may or may not be at the same time.

Also, the shape of the roulette is not limited to a circular form, and it may be in any shape. For example, the roulette may have a triangle or a square shape and spin. Also, the number of the roulette is not limited to one, and there may be a plurality of roulettes. In a case when a plurality of the roulettes exists, each roulette may select one symbol, or each roulette may select a plurality of symbols. Further, the number of frames provided on the roulette is not limited, and it may be any number. For example, the outer frame of the roulette may consist of 36 frames or 4 frames. And, the middle frame of the roulette may consist of 4 frames or 16 frames, instead of 8 frames.

The symbol for specifying the gaming machine may be decided at the beginning of the secondary game, decided beforehand, or decided at any time. For example, the machine number may be the symbol. The symbol for specifying the gaming machine is not limited to be displayed on the display 9. It may be displayed on any part, such as the display 8. Further, it may be configured such that the symbol is not displayed on the gaming machine but the player can recognize the symbol, which represents himself or herself. For example, some sort of information stored in a player's card may be displayed on the roulette as a symbol. Further, the number printed on the machine main body may be displayed on the roulette as a symbol.

In addition to those described above, for example, each award amount of a progressive may be displayed on the roulette in a case of the progressive game. For example, each award amount of a progressive is displayed on each of the middle frame 26, and the selection unit 28 stops at a progressive award amount with a symbol. Then, the machine corresponding to the symbol may be able to receive the progressive award. Further, a game mode may be displayed on the roulette. In such case, for example, the machine selected by the selection unit 28 may start a bonus game with selected game mode. Also, a display indicating a jackpot is provided on the roulette and in a case when the selection unit 28 has selected the jackpot, the jackpot may be paid out at the selected machine. Further, the number of times of game may be displayed on the roulette. In such case, for example, a number of times of free game corresponding to the selected number of times of game may be started on the machine selected by the selection unit 28.

Also, the symbol displayed in the frame on the roulette may indicate losing instead of winning. For example, in FIG. 3, out of 8 frames of the inner frame 27, some frames may display a losing symbol. In a case when the selection unit 28 has selected a losing symbol, the player may not be able to proceed into the secondary game.

Further, among a plurality of the gaming machines, not all of the machines need to proceed into the secondary game. For example, four machines are performing the primary game, and one or two machines out of those machines may proceed into the secondary game. In such case, for example, the symbols displayed on the 8 frames of the inner frame 27 may only display the machines, which have proceeded into the secondary game. Further, the symbols indicating losing may be included in these symbols.

Figure 4:
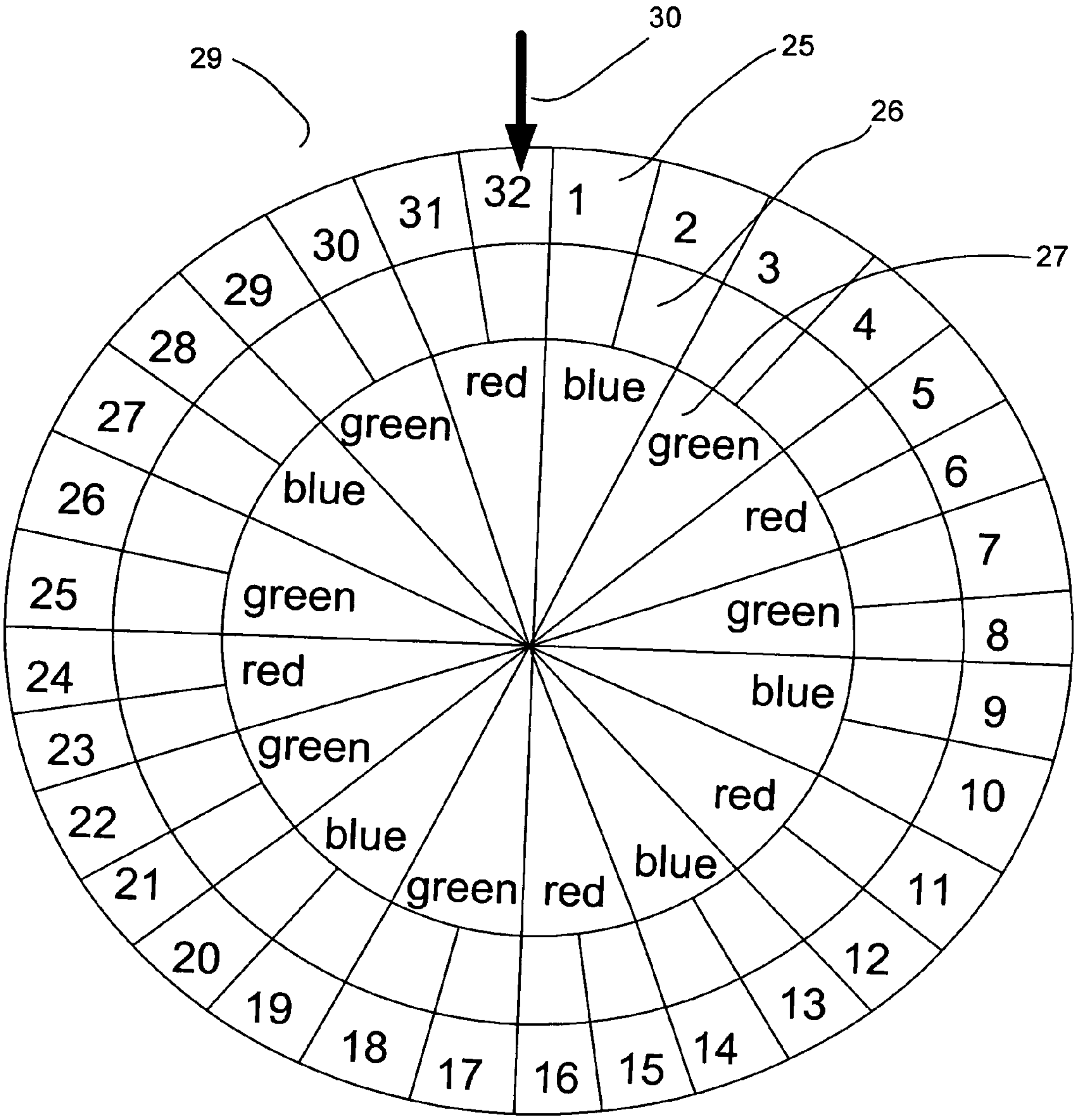
FIG. 4 illustrates an example of a secondary game pertaining to the present invention.

FIG. 4 illustrates an example of a secondary game pertaining to the present invention. A roulette 29 is provided with the outer frame 25, the middle frame 26 and the inner frame 27. The inner frame of the roulette 29 consists of 16 frames. And one color out of red, blue or green is shown in each frame. In FIG. 4, each color is randomly arranged without congregating on the inner frames. When the roulette is started and a color is selected, an award is paid out to the machine corresponding to the color. A selection unit for the color is an arrow 30. A winning symbol is selected as the roulette 29 spins, or as the arrow 30 moves along the roulette. In FIG. 4, the arrow 30 has selected red, thus the machine corresponding to red is paid out.

Figure 5:
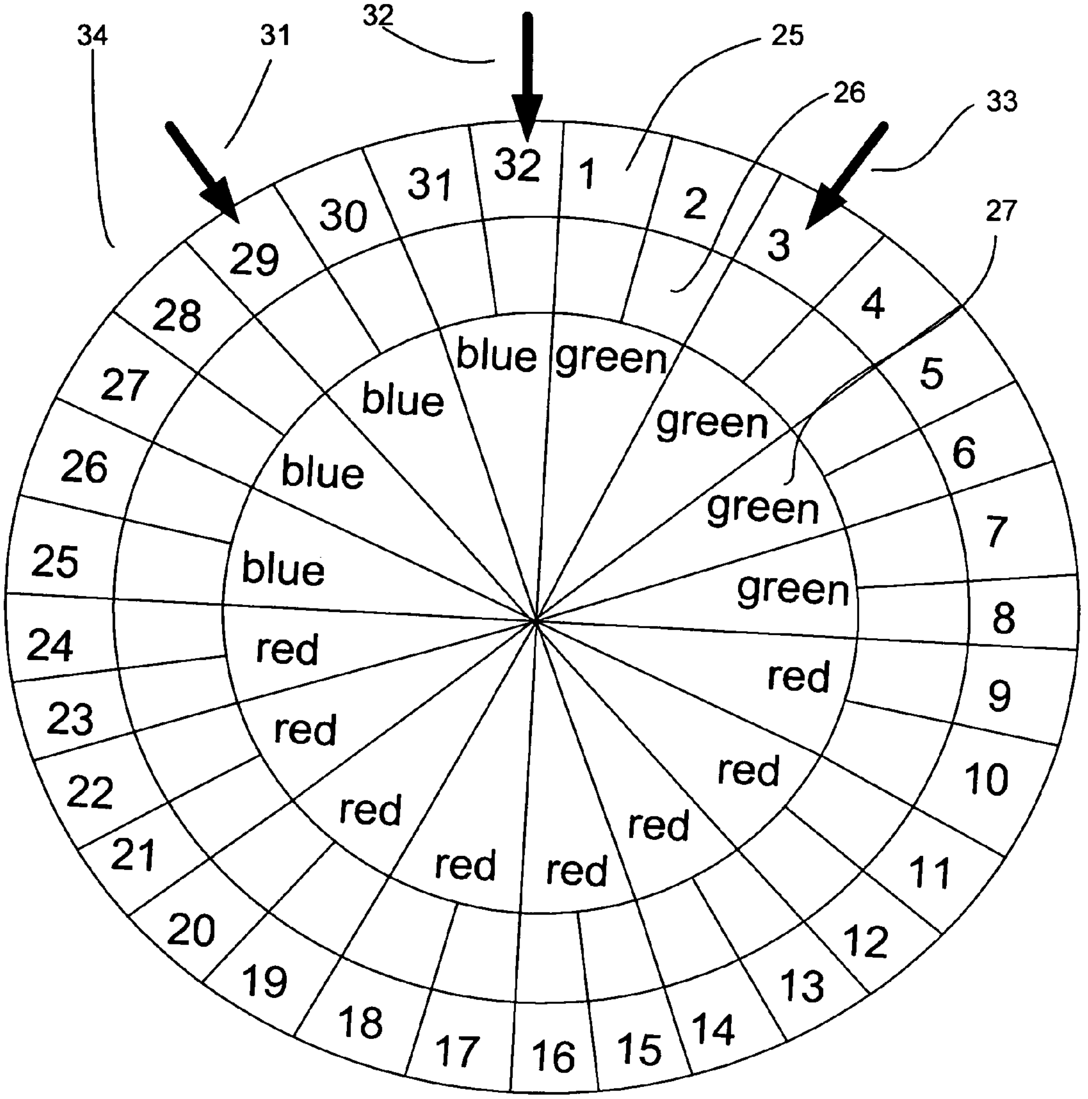
FIG. 5 illustrates an example of a secondary game pertaining to the present invention.

FIG. 5 illustrates an example of a secondary game pertaining to the present invention. A roulette 34 is provided with the outer frame 25, the middle frame 26 and the inner frame 27. The inner frame of the roulette 34 consists of 16 frames. And one color out of red, blue or green is shown in each frame. When the roulette is started and a color is selected, an award is paid out to the machine corresponding to the color. In FIG. 5, there are three selection units for the color, an arrow 31, an arrow 32 and an arrow 33, which are provided to the roulette. By the arrows 31 to 33, three colors are selected. In addition, any one of the arrows 31 to 33 or any combination of the arrows 31 to 33 may be functioned. For example, only the colors indicated by the arrows 31 and 32 out of arrows 31 to 33 may be selected.

In contrast to FIG. 4, each color is congregated on the inner frame of FIG. 5. That is, the color red is selected when the arrow stops on the outer frame numbered from 9 to 24. Also, the color green is selected when the arrow stops at the outer frame numbered from 1 to 8. In this way, the players can recognize the colors indicating themselves at one glance in FIG. 5.

Meanwhile, in a case when there is a plurality of the selection units, the award amount larger than the award amount paid out in a ordinary case may be awarded when a plurality of the same type the symbols is selected by a plurality of the selection units. For example, in FIG. 5, the arrows 31 and 32 have selected blue and the arrow 33 has selected green. In such case, the machine corresponding to blue may be awarded twice as higher than the machine corresponding to green.

Figure 6:
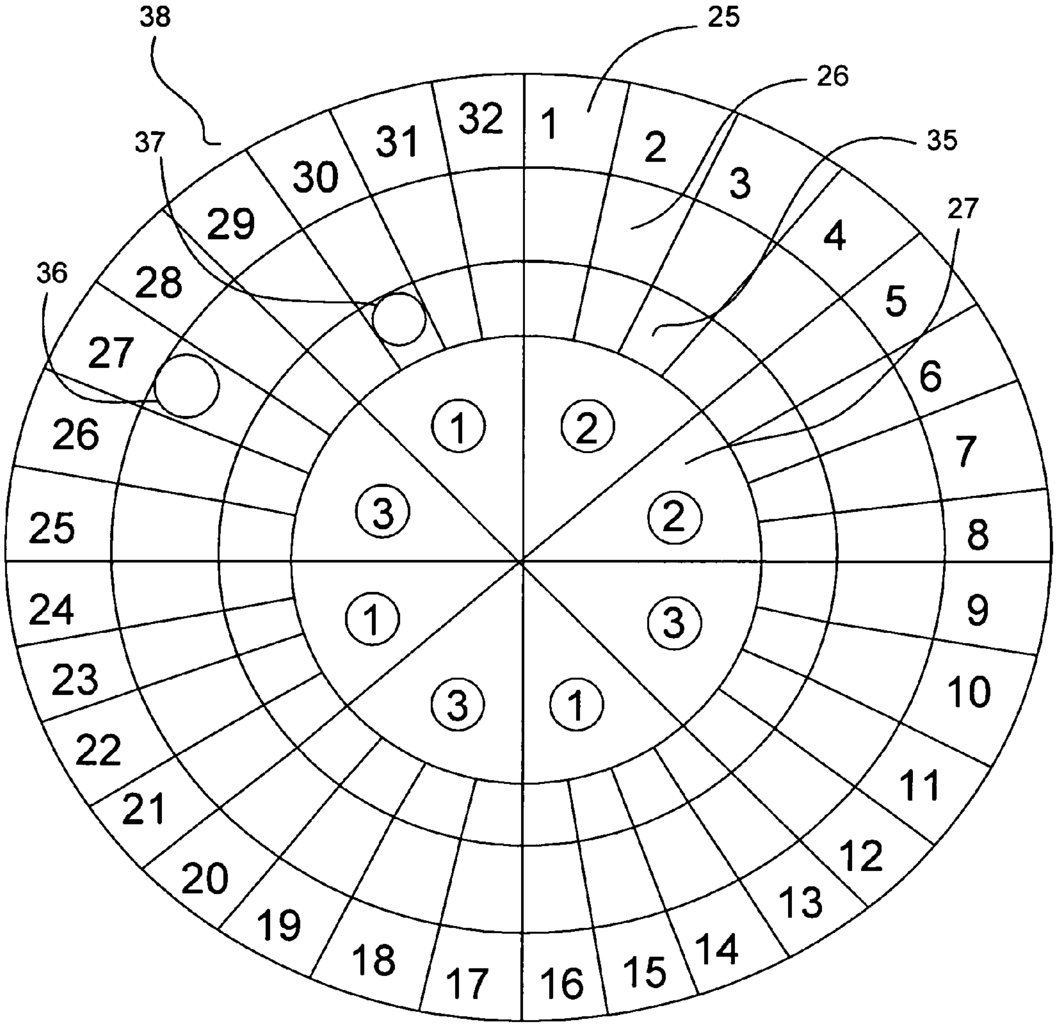
FIG. 6 illustrates an example of a secondary game pertaining to the present invention.

FIG. 6 illustrates an example of a secondary game pertaining to the present invention. A roulette 38 is provided with the outer frame 25, middle frames 26 and 35, and the inner frame 27. The middle frames 26 and 35 respectively have selection units 36 and 37. The selection unit 36 has stopped on the middle frame 26 and has selected the symbol ③, which specifies the machine. The selection unit 37 has stopped on the middle frame 35 and has selected the symbol ①, which specifies the machine. The award is paid out to the machines corresponding to the symbols ① and ③. The selection units 36 and 37 may move and stop on the inner frame 27 or the outer frame 25.

Figure 7:
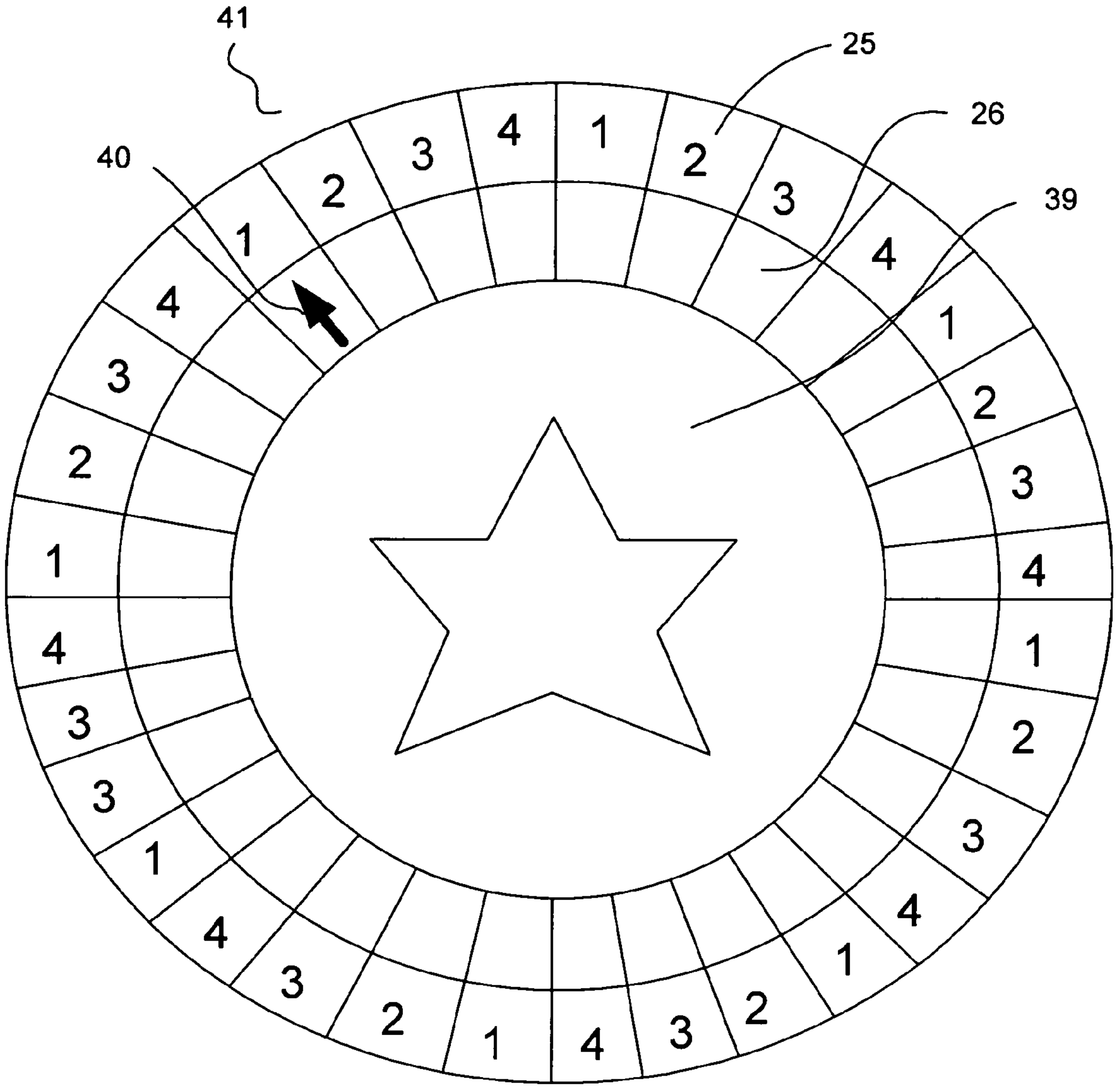
FIG. 7 illustrates an example of a secondary game pertaining to the present invention.

FIG. 7 illustrates an example of a secondary game pertaining to the present invention. A roulette 41 is provided with the outer frame 25, the middle frame 26, and a center portion 39. On the outer frame 25, numbers from 1 to 4 are arranged regularly. An arrow 40 is shown on the middle frame 26. The arrow 40 moves so as to rotate along the middle frame 26. And the arrow 40 selects any number from 1 to 4 shown on the outer frame. The machine corresponding to the selected number is paid out with an award. It may be configured such that the arrow 40 is fixed and the roulette 41 spins.

On the center portion 39, a picture of a star shape is shown. In this way, the presentation may be boosted by creating a portion that has no relation to the machine selection. For example, the center portion may not display anything, such as picture when the roulette is stopped, and any picture or animation may be displayed on the center portion when the roulette starts to spin. Such portion may not need to be on the center of the roulette, and it may be located anywhere, such as, on the outer frame.

Figure 8:
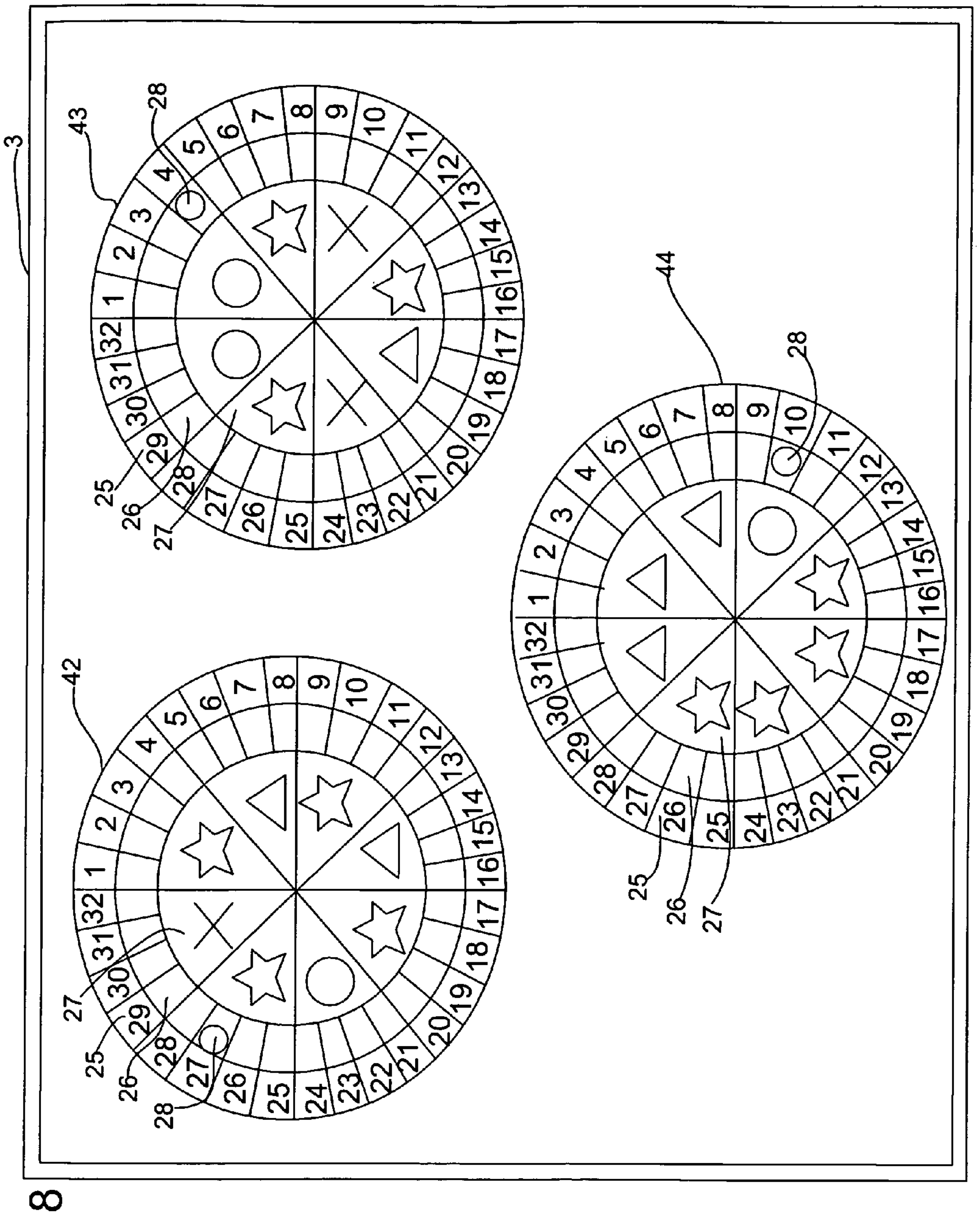
FIG. 8 illustrates an example of a secondary game pertaining to the present invention.

FIG. 8 illustrates an example of a secondary game pertaining to the present invention. In FIG. 8, the display 3 is shown, and roulettes 42 to 44 is shown on the display 3. Each of the roulettes 42 to 44 is provided with the outer frame 25, the middle frame 26, the inner frame 27, and the selection unit 28. As shown in FIG. 8, for example, the symbols corresponding to the winning machines may be selected by a plurality of the roulettes. As shown in FIG. 8, a plurality of the roulettes may be displayed at the same time, or alternately displayed one by one. The items described above, such as, the award amount increases when two or more symbols of the same type are selected, namely, the winning ratio is changed corresponding to the wager amount, losing symbols be included, or the number of frames is not limited, are also applicable to a plurality of the roulettes in FIG. 8.

Figure 9:
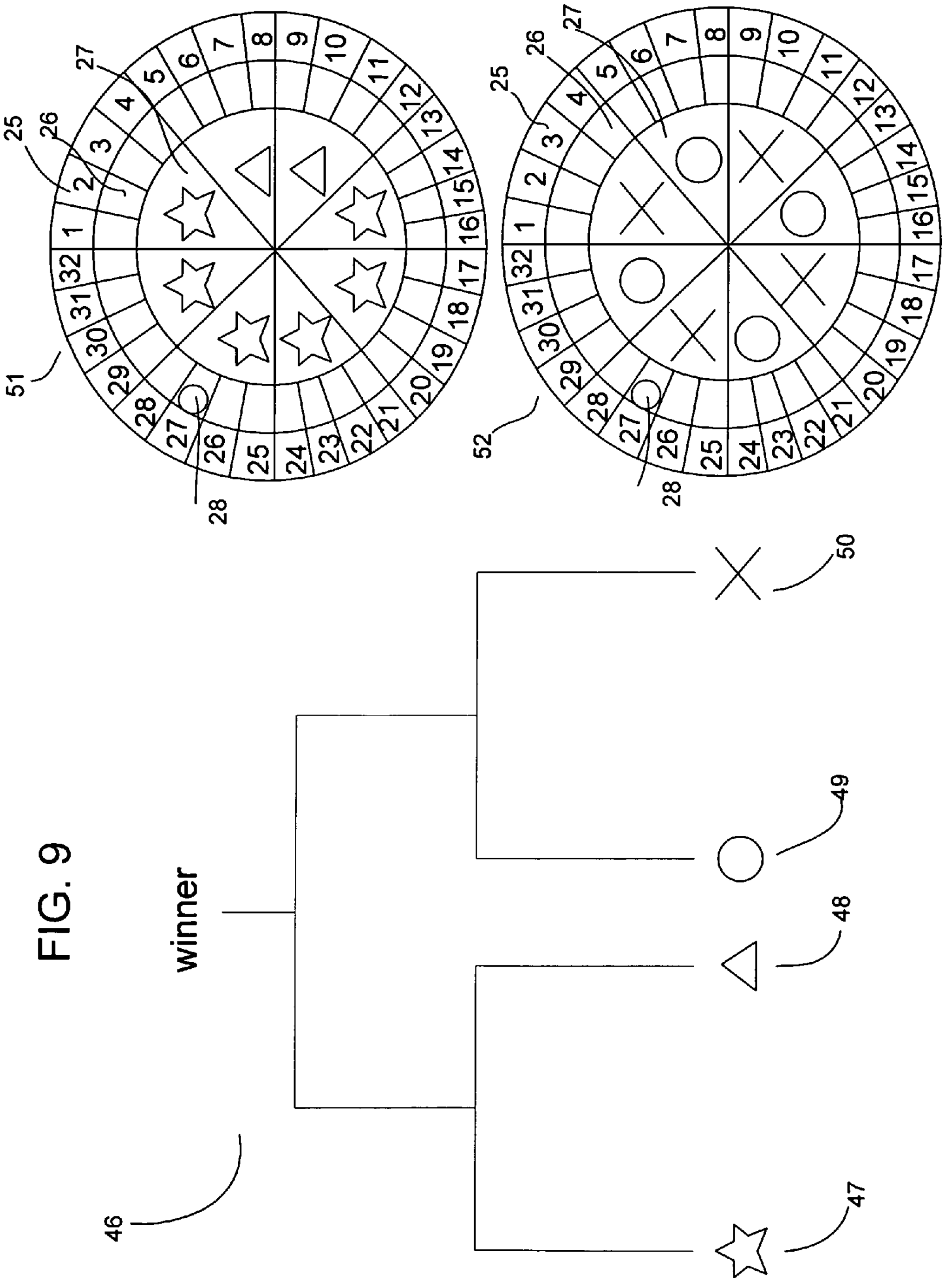
FIG. 9 illustrates an example of a secondary game in a tournament play.

FIG. 9 illustrates an example of a secondary game with a tournament play. FIG. 9 shows a tournament 46. FIG. 9 is a case when a number of a plurality of machines is 4, and the symbol corresponding to each machine is a star 47, a triangle 48, a circle 49, and an X 50. In FIG. 9, first, a roulette 51 decides which one of the star 47 and the triangle 48 wins. Next, a roulette 52 decides which one of the circle 49 and the X 50 wins. In this way, the winners for the first round of the tournament are decided.

The number of machine may be in any number, and the combination for the first round of the tournament may be in any number of combinations. Further, the first round of the tournament does not need to be played by two machines each, and it may be played by any number of machines. For example, the first round of the tournament may be played by three machines each. The forms or the scheme of the roulette used may be the same as described above.

Figure 10:
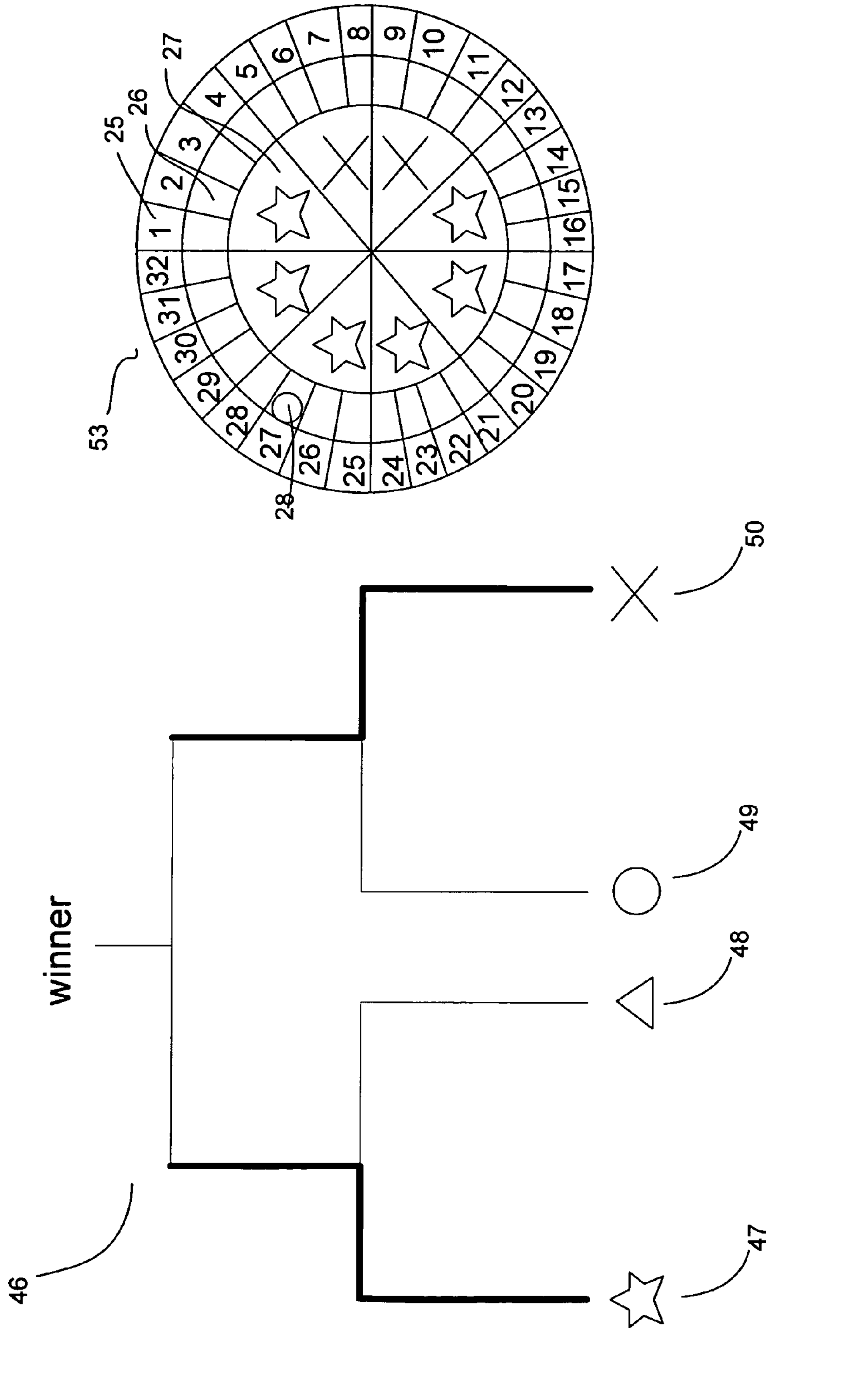
FIG. 10 illustrates an example of a secondary game in tournament play.

FIG. 10 illustrates an example of a secondary game with the tournament play. FIG. 10 illustrates the tournament after the winners of the first round are decided in FIG. 9. In FIG. 10, the star 47 and the X 50 are the winners of the first round, and the solid lines corresponding to the star 47 and the X 50 in the tournament 46 are shown in bold. In FIG. 10, the second round is played by a roulette 53. That is, the roulette 53 decides which one of the star 47 and the X 50 will be the winner. The award is paid out from the winning machine.

As same with the first round, the second round does not need to be played by two machines, and it may be played by any number of machines each. For example, the second round of the tournament may be played by three machines each. Further, the tournament does not need to be two rounds, it may have any number of rounds. Also, the winner is indicated in the bold solid line on the tournament, however, the winner may be indicated by any methods. For example, the winner may be indicated by illuminating light bulbs arranged on the solid line of the tournament. The form or the scheme of the roulette used may be the same as described above.

Figure 11:
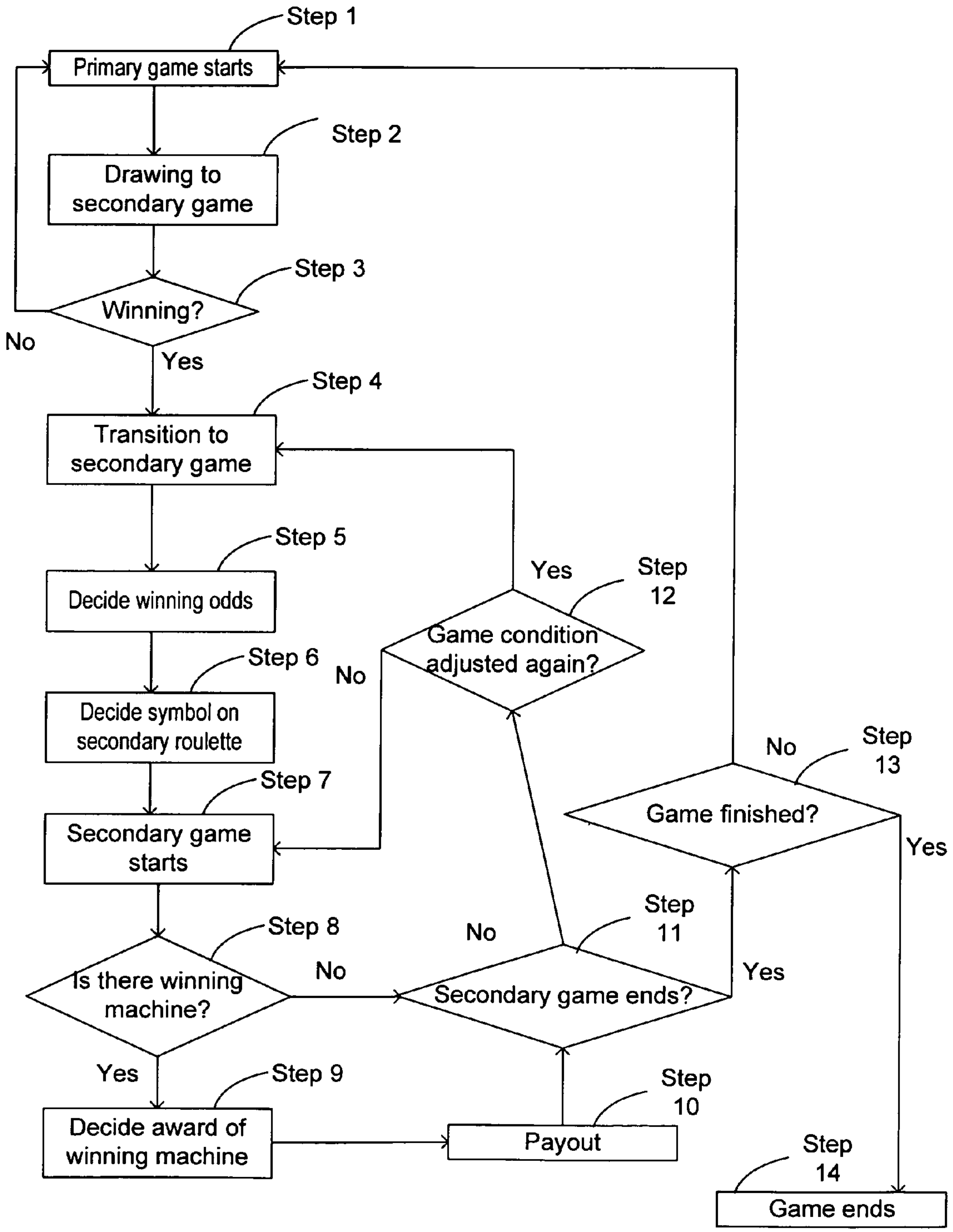
FIG. 11 illustrates a flow chart pertaining to the present invention.

FIG. 11 illustrates a flow chart pertaining to the present invention. In a game system of the present invention, first, the primary game is started (Step 1). After the primary game is started, a drawing is performed in regards to the transition to the secondary game (Step 2). As a result of the drawing, a determination is made as to whether there was a winning to proceed into the secondary game or not (Step 3). When determined that there was the winning to proceed into the secondary game, a transition is made from the primary game to the secondary game (Step 4). When determined that there was no winning to proceed into the secondary game, the primary game is started again (Step 1).

When there was the transition to the secondary game (Step 4), winning odds of a plurality of the machines (Step 5), and the form of the symbols to be shown on the secondary roulette (Step 6) are decided. The order of decision of winning odds and of the form of the symbols may be reversed. Thereafter, the secondary game is started (Step 7). After the secondary game is started, a determination is made as to whether there is a winning machine in the secondary game or not (Step 8). When there is the winning machine, award amount for the winning machine is decided (Step 9), and the award amount is paid out to the winning machine (Step 10).

When there is no winning machine (Step 8), or when the award amount is paid out to the winning machine (Step 10), a decision is made as to whether the secondary game has completed or not (Step 11). When the secondary game is determined not to have completed, a determination is made as to whether to adjust the game condition of the secondary game again or not (Step 12). When the game condition needs to be adjusted again, the secondary game resumes after adjusting the game condition (Step 4). When there is no need for the game condition to be adjusted again, the secondary game resumes according to the original setting without the adjustment of the game condition (Step 7).

When the secondary game is determined to have been completed, a determination is made as to whether the entire game has been completed or not (Step 13). When the entire game is determined not to have been completed, the primary game is started again (Step 1). When the entire game is determined to have been completed, the game ends (Step 14).

Figure 12:
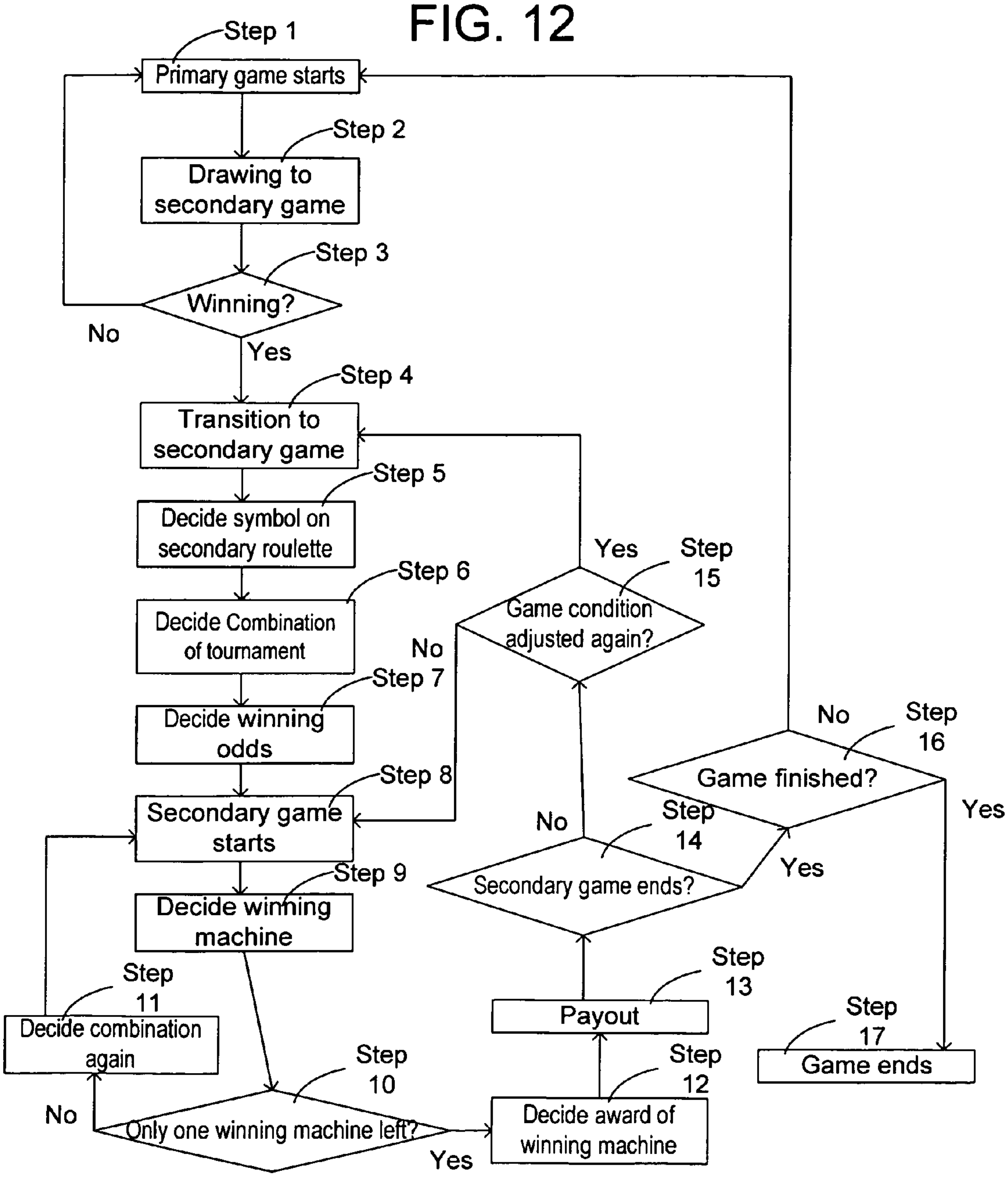
FIG. 12 illustrates a flow chart of the tournament play.

FIG. 12 illustrates a flow chart of the tournament play. In a game system of the present invention, first, the primary game is started (Step 1). After the primary game is started, a drawing is performed in regards to the transition to the secondary game (Step 2). As a result of the drawing, a determination is made as to whether there was a winning to proceed into the secondary game or not (Step 3). When determined that there was the winning to proceed into the secondary game, a transition is made from the primary game to the secondary game (Step 4). When determined that there was no winning to proceed into the secondary game, the primary game is started again (Step 1).

When there is the transition to the secondary game (Step 4), the form of the symbols shown on the secondary roulette (Step 5), the combination of the tournament (Step 6), and the winning odds of the machine (Step 7) are decided. The order of the decisions of the winning odds, the combination of the tournament, and the form of the symbols, may be in reverse order. Thereafter, the secondary game is started (Step 8). After the secondary game is started, a winning machine is decided in the secondary game (Step 9). And a determination is made as to whether the number of the winning machine is one or not (Step 10). In a case when a plurality of the winning machines still exists instead of one winning machine, the combination is rearranged among the winning machines and the tournament is created. Then, in order to decide one winner, the secondary game is started again (Step 8). Meanwhile, the number of the winning machine is determined to be one, an award amount for the winning machine is decided (Step 12), and the award amount is paid out to the winning machine (Step 13).

In addition, the system may be configured to payout the award to a plurality of the winning machines in a case when a plurality of the winning machines exists in Step 10. Further, the combination of the tournament is arranged again in the Step 11, however, the game may be proceeded according to the original tournament without changing the combination.

When the award amount is paid out to the winning machine (Step 13), a determination is made as to whether the secondary game is completed or not (Step 14). When the secondary game is determined to have not completed, a determination is made as to whether to adjust the game condition of the secondary game again or not (Step 15). In a case when the game condition needs to be adjusted again, the secondary game resumes after adjusting the game condition (Step 4). In a case when the game condition does not need to be adjusted again, the secondary game resumes according to the original setting without adjusting the game condition (Step 8).

When the secondary game is determined to have completed, a determination is made as to whether the entire game has completed or not (Step 16). In a case when the entire game is determined not to have completed, the primary game is started again (Step 1). In a case when the entire game is determined to have completed, the game ends (Step 17).

The present invention is explained according to the examples described above, however, the present invention is not limited to those examples. For example, it is mentioned in the above that the only the winning machine is paid out with the award, however, the game may be configured to payout the award amount to the gaming machine that did not win the game. Further, instead of the award amount, another item may be given to a player as a result of winning. Also, as for the means for selecting the frame on the roulette, for example, an electrical lighting may be utilized. Also, it is mentioned above that the game system of the present invention is performed with tournament play, however, for example, the group match may be employed.

What is claimed is:

1. A game system for providing a wheel game to a plurality of players, comprising:

a wheel;

a plurality of gaming machines, each of which accepts a wager from a player and provides a primary game to the player;

a controller, which initiates a secondary game using the wheel when a predetermined condition is met, and which allows a plurality of players who have played the primary games to join the secondary game and determines a winner of the secondary game from the players who have joined the secondary game;

a plurality of indicia placed on the wheel, each of the indicia representing one of the players; and an indicator, which points to one of the indicia;

wherein the controller relatively moves the indicator to the indicia and stops the relative movement so that the indicator points to one of the indicia in the secondary game;

wherein the controller makes a player the winner of the secondary game when the indicator points to the player indicium; and wherein the controller changes a number of indicia representing one player based on an amount of wager this player has bet in the primary game.

2. The game system of claim 1, wherein the indicia are placed in circle around a rotational axis of the wheel.

3. The game system of claim 2, wherein the wheel comprises at least two adjoining indicia both of which represent a same player.

4. The game system of claim 2, wherein the wheel comprises a plurality of numerals placed in circle around the rotational axis of the wheel; and wherein the indicator points to one of the numerals as well as to one of the indicia.

5. The game system of claim 4, wherein the indicia are placed on the wheel corresponding to the positions where the numerals are placed; and wherein a number of indicia is smaller than a number of numerals.

6. The game system of claim 1, wherein the primary game is also a wheel game, and a number of frames of the wheel used in the primary game is different from a number of frames of the wheel used in the secondary game.

7. A game system for providing a wheel game to a plurality of players, comprising:

a wheel;

a plurality of consoles, each of which accepts a bet for a game from the player;

a controller, which initiates the wheel game and determines a winner from the players;

a plurality of indicia placed on the wheel, each of the indicia representing one of the players; and an indicator, which points to one of the indicia;

wherein the controller relatively moves the indicator to the indicia and stops the relative movement so that the indicator points to one of the indicia;

wherein the controller makes a player the winner of the wheel game when the indicator points to the player indicium; and wherein the controller changes a number of indicia representing one player based on an amount of bet by this player.

8. The game system of claim 7, wherein the indicia are placed in circle around a rotational axis of the wheel.

9. The game system of claim 8, wherein the wheel comprises at least two adjoining indicia both of which represent a same player.

10. The game system of claim 8, wherein the wheel comprises a plurality of numerals placed in circle around the rotational axis of the wheel; and wherein the indicator points to one of the numerals as well as to one of the indicia.

11. The game system of claim 10, wherein the indicia are placed on the wheel corresponding to the positions where the numerals are placed; and wherein a number of indicia is smaller than a number of numerals.

12. A game system for providing a wheel game to a plurality of players, comprising:

a wheel;

a plurality of consoles, each of which accepts a bet for a game from the player;

a controller, which initiates the wheel game and determines a winner from the players;

a plurality of indicia placed on the wheel, each of the indicia representing one of the players; and an indicator, which points to one of the indicia;

wherein the controller relatively moves the indicator to the indicia and stops the relative movement so that the indicator points to one of the indicia;

wherein the controller makes a player the winner of the wheel game when the indicator points to the player indicium; and wherein the controller changes a wheel area including only identical indicia representing one player based on an amount of bet by this player.

13. The game system of claim 12, wherein the indicia are placed in circle around a rotational axis of the wheel.

14. The game system of claim 13, wherein the wheel comprises at least two adjoining indicia both of which represent a same player.

15. The game system of claim 13, wherein the wheel comprises a plurality of numerals placed in circle around the rotational axis of the wheel; and wherein the indicator points to one of the numerals as well as to one of the indicia.

16. The game system of claim 15, wherein the indicia are placed on the wheel corresponding to the positions where the numerals are placed; and wherein a number of indicia is smaller than a number of numerals.

* * * * *